United States Patent
Zhou et al.

(10) Patent No.: US 11,181,181 B1
(45) Date of Patent: Nov. 23, 2021

(54) DIFFERENTIAL THERMAL MANAGEMENT SYSTEM

(71) Applicant: Ford Global Technologies, LLC, Dearborn, MI (US)

(72) Inventors: Shiguang Zhou, Ann Arbor, MI (US); Gregory Daniel Goleski, Rochester Hills, MI (US); David Karl Bidner, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/011,646

(22) Filed: Sep. 3, 2020

(51) Int. Cl.
*F16H 57/04* (2010.01)

(52) U.S. Cl.
CPC ....... *F16H 57/0413* (2013.01); *F16H 57/045* (2013.01); *F16H 57/0457* (2013.01); *F16H 57/0483* (2013.01)

(58) Field of Classification Search
CPC .............. F16H 57/0413; F16H 57/045; F16H 57/0483; F16H 57/0457
See application file for complete search history.

(56) References Cited

U.S. PATENT DOCUMENTS

| | | | |
|---|---|---|---|
| 6,044,645 A * | 4/2000 | Greenan | F16H 57/0412 60/337 |
| 6,997,284 B1 * | 2/2006 | Nahrwold | F16H 57/0447 165/117 |
| 8,167,758 B2 * | 5/2012 | Downs | F16H 57/0483 475/160 |
| 8,672,094 B2 * | 3/2014 | Quehenberger | F16H 57/0457 184/6.12 |
| 8,707,826 B2 * | 4/2014 | Jacobs | F16H 57/0447 74/607 |
| 8,715,127 B2 | 5/2014 | Beutler et al. | |
| 9,360,104 B1 | 6/2016 | Lippert et al. | |
| 9,920,828 B2 * | 3/2018 | Fast | F16H 57/037 |
| 9,927,020 B2 * | 3/2018 | Keeney | F16H 57/037 |
| 10,190,673 B2 * | 1/2019 | Creech | F16H 57/045 |
| 2006/0054411 A1 | 3/2006 | Fett et al. | |
| 2019/0162291 A1 | 5/2019 | Gerges et al. | |

* cited by examiner

*Primary Examiner* — Sherry L Estremsky
(74) *Attorney, Agent, or Firm* — Vincent Mastrogiacomo; Brooks Kushman P.C.

(57) ABSTRACT

A cooling system differential oil contained in the housing of a differential for a vehicle. The differential includes a housing containing a first portion of differential oil. A tank contains a second portion of differential oil. An inlet passage is provided through which differential oil flows from the housing to the tank. An outlet passage is provided through which differential oil flows from the tank to the housing. A valve is disposed in the outlet passage that has a closed position preventing differential oil from flowing through the outlet passage. The valve has an open position in which differential oil is permitted to flow from the tank to the housing in response to the temperature of the differential oil in the housing exceeding a predetermined temperature.

18 Claims, 2 Drawing Sheets

DIFFERENTIAL THERMAL MANAGEMENT SYSTEM

TECHNICAL FIELD

This disclosure relates to systems for managing the temperature of oil in a differential.

BACKGROUND

Axles driven by a driveshaft include a differential that compensates for differences in wheel rotational speeds that are encountered when driving around a curve or making a turn. Differentials are lubricated and cooled by specialized oil that circulates through the differential as a result of the rotation of gears contained in the differential.

Engine power output requirements and towing loads can cause temperature thresholds of some oils to be exceeded. Some oil formulations offer fuel economy improvements but may have lower temperature threshold limits.

This disclosure is directed to solving the above problems and other problems as summarized below.

SUMMARY

According to one aspect of this disclosure, a differential of a vehicle is disclosed that includes a housing for the differential and a tank containing a quantity of oil that is selectively supplied to the differential to reduce the temperature of oil in the differential. The housing contains oil that is splashed by a gear within the housing. A tank is attached to the housing behind the axle. A tank inlet receives oil from the housing and directs the oil to the tank until the tank is full. A tank outlet provides oil to the housing from the tank. The tank outlet includes a valve that opens when the oil temperature in the housing is above a predetermined level to allow the oil in the tank to be supplied to the housing and recirculated to the tank inlet up to a point that the tank is full of the oil.

According to other aspects of this disclosure, the valve may be a wax valve. The wax valve may be adapted to close when the oil temperature in the housing is below the predetermined level.

In one alternative, the system may further comprise a controller, and a temperature sensor that senses the oil temperature of the oil in the housing and provides a signal to the controller when the oil temperature of the oil in the housing is above a predetermined level. The controller opens the valve when the signal is received by the controller. The temperature sensor may provide a second signal to the controller when the temperature of the oil in the housing is below the predetermined level. The controller closes the valve when the second signal is received by the controller.

The system may further comprise an oil fill port provided in the tank through which the oil is supplied to initially fill the tank, wherein the oil is further supplied through the oil fill port to fill the housing to a predetermined level. The tank inlet opens into the housing above a middle of the housing and may return oil to the housing when the tank is full. The tank inlet may be connected to a conduit that extends horizontally from an upper portion of the housing to the tank inlet. The tank outlet may open into the housing below a middle of the housing.

According to another aspect of this disclosure, a cooling system is disclosed for the oil in a differential of a vehicle. The cooling system is attached to a housing enclosing the differential that contains a first portion of the oil. A tank contains a second portion of the oil. The tank includes an oil inlet in fluid communication with the housing of the differential and an oil outlet selectively in fluid communication with the housing. A valve disposed in the oil outlet prevents the second portion of the oil from flowing from the tank into the housing through the oil outlet when an oil temperature of the first portion of the oil in the housing is below a predetermined level. The second portion of the oil is permitted to flow from the tank to the housing when the temperature of the first portion of the oil in the housing is above a predetermined level.

According to further aspect of this disclosure, a cooling system is provided for the differential oil contained in the housing of a differential for a vehicle. The differential includes a housing containing a first portion of differential oil. A tank contains a second portion of differential oil. An inlet passage is provided through which differential oil flows from the housing to the tank. An outlet passage is provided through which differential oil flows from the tank to the housing. A valve is disposed in the outlet passage that has a closed position wherein differential oil is prevented from flowing through the outlet passage. The valve has an open position in which differential oil is permitted to flow from the tank to the housing in response to the temperature of the differential oil in the housing exceeding a predetermined temperature.

According to other aspects of this disclosure as it relates to a cooling system, the volume of the second portion of differential oil may be greater than the volume of the first portion.

A gear of the differential may be used to splash differential oil from the housing to the inlet passage to refill the tank from the differential oil contained in the housing.

The valve may be a wax valve. Alternatively, the cooling system may further comprise a controller, and an oil temperature sensor that senses the oil temperature of the oil in the housing. The sensor may be used to provide a signal to the controller to open the valve when the temperature of the oil in the housing is above a predetermined level.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
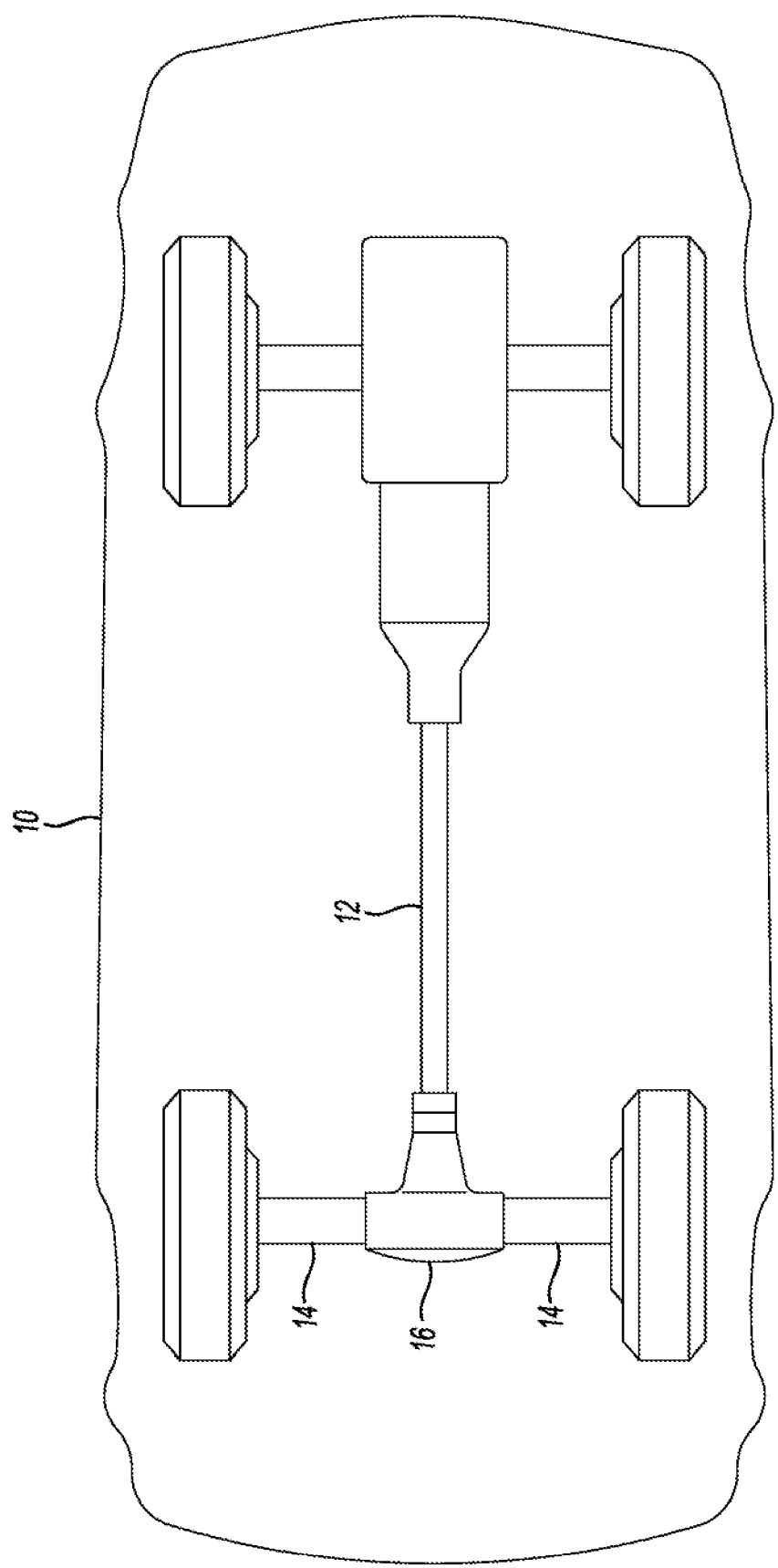
FIG. 1 is a top plan view of a vehicle showing the differential including the tank of the cooling system, the driveshaft, and axle shafts.

Referring to FIG. 1, a vehicle 10 is illustrated diagrammatically to show the driveshaft 12 that provides torque to two axle shafts 14 through a differential 16.

Figure 2:
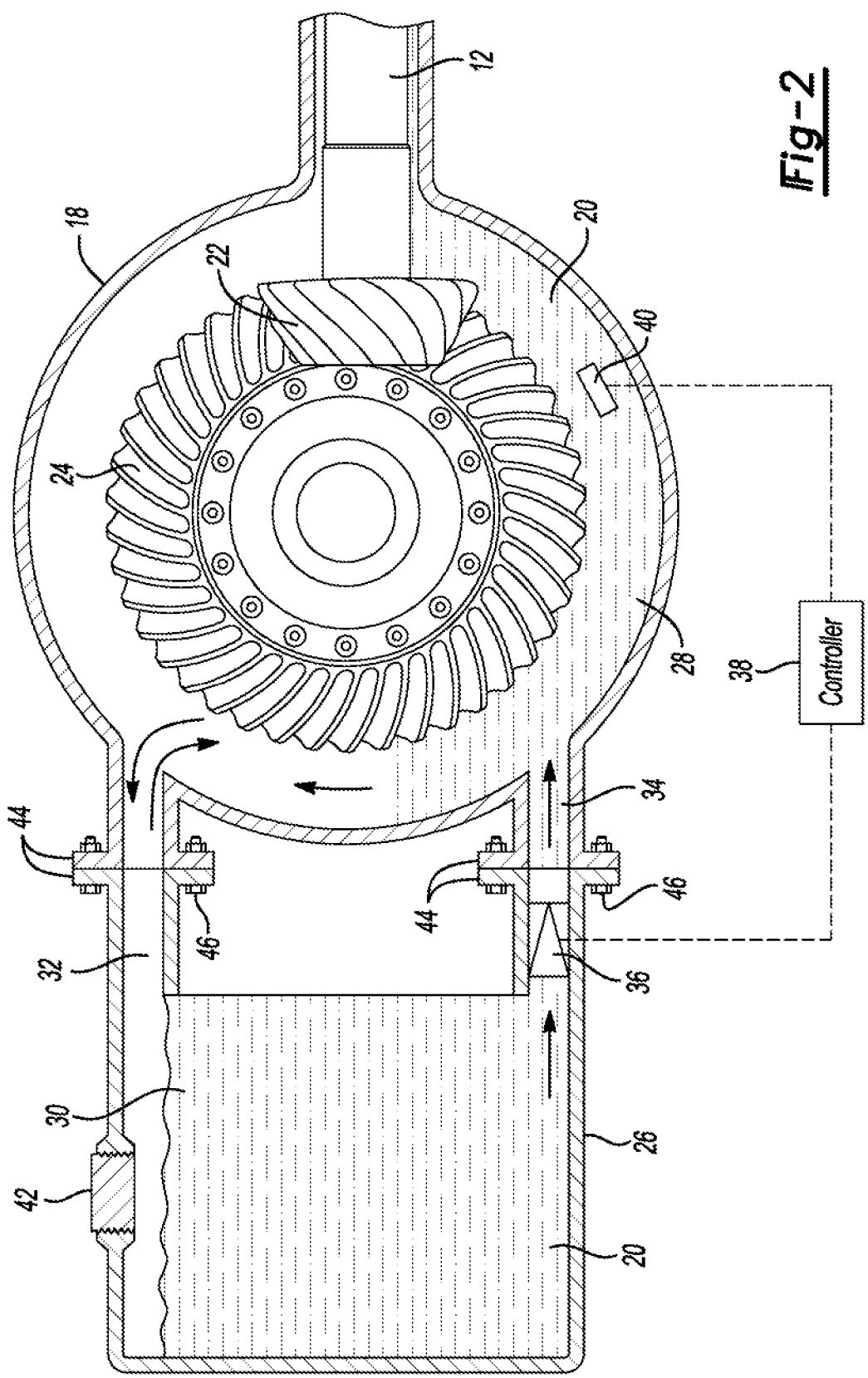
FIG. 2 is a diagrammatic cross section view of a differential including a tank that functions as part of a cooling system for the differential.

Referring to FIG. 2, a housing 18 of the differential 16 encloses a bevel gear 22 attached to the drive shaft 12 and a ring gear 24.

A tank 26 is attached to the housing 18 that contains differential oil 20 (hereinafter "oil 20"). The oil 20 lubricates the ring gear 24 and bevel gear 22 that transfer power from the driveshaft 12 to the axle shafts 14.

A first portion of the oil 28 is contained within the housing 18 and a second portion of the oil 30 is contained within the tank 26. The oil 20 is permitted to flow from the housing 18 to the tank 26 through an inlet passage 32 (inlet to the tank 26) and from the tank 26 to the housing 18 through an outlet passage 34 (outlet from the tank 26). A valve 36 is provided in the outlet passage 34. The valve 36 may be a wax valve in one embodiment and may be an electronically controlled valve in another embodiment.

If the valve 36 is an electronically controlled valve, a controller 38 controls the opening and closing of the valve 36 in response to signals indicative of the temperature of the first portion 28 of the oil 20 as sensed by a temperature sensor 40 disposed in the housing 18. If the temperature of the first portion 28 of the oil 20 exceeds a first predetermined level, the temperature sensor 40 generates an "oil hot" signal that is received by the controller 38. Responsive to receiving the "oil hot" signal, the controller 38 commands the valve 36 to open thereby allowing cooler oil from the tank 26 to flow into the housing 18 as indicated by the two arrows pointing to the right in the lower portion of FIG. 2. If the temperature of the first portion 28 of the oil 20 falls below a second predetermined temperature, the temperature sensor 40 generates an "oil cool" signal that is received by the controller 38. Responsive to receiving the "oil cool" signal, the controller 38 commands the valve 36 to close thereby stopping the flow of the cooler oil 20 from the tank 26 to flow into the housing 18.

If the valve 36 is a wax valve, opening a closing the valve 36 is simplified and the controller 38 and temperature sensor 40 may be eliminated. The wax valve includes wax within a sealed cylinder that undergoes a phase change when heated that causes the cylinder to expand and open the valve. When the oil cools, the cylinder contracts and closes the valve 36.

The second portion 30 of oil 20 in the tank 26 only circulates when the valve 36 is open. When the valve is not open, the second portion 30 of the oil 20 is cooled in the tank 26 by air flowing around the tank 26. The tank 26 may be provided with cooling fins (not shown) that increase the surface area of the tank 26 and facilitate cooling the tank 26 and the second portion 32 of oil 20 in the tank.

Excess oil 20 in the housing is returned to the tank 26 through the inlet passage 32. The ring gear 24 or another type of gear splashes oil 20 up toward the inlet passage as shown by the vertical arrow in the housing in FIG. 2. The tank 26 is refilled as shown by the arcuate arrow pointing upwardly and to the left in FIG. 2. If the level of oil 20 in the tank 26 exceeds the maximum level (the maximum level corresponds to the bottom of the inlet passage 32) the oil 20 is returned as indicated by the arcuate arrow pointing to the right and downwardly in FIG. 2.

An oil fill port 42 is provided in an upper portion of the tank 26 for filling and refilling the oil 20 in the housing and in the tank 26. Oil 20 supplied through the oil fill port 42 is initially supplied to the tank 26 until it is full. After the tank 26 is full, the oil 20 flows through the inlet passage 32 to fill the housing to the desired level by supplying the specified amount of oil 20 for the system.

The tank 26 is attached to the housing 18 with a set of flanges 44 that are secured together with a plurality of fasteners 46. If the auxiliary tank 26 is not required for a vehicle, cover plates (not shown) may be used to cap the inlet passage 32 and the outlet passage 34.

Engine power output requirements and towing loads may cause the oil 20 to be heated to a level that exceeds the temperature thresholds of some differential oils. Some differential oils have been developed that offer fuel economy improvements but may have lower temperature threshold limits. Oil formulations offering improved fuel efficiency but with lower temperature thresholds can be used more widely if the oil can be cooled. However, coolant systems that circulate the oil to a remote heat exchanger on the vehicle add substantial cost that may not be justified for the purpose of using high efficiency/lower temperature threshold oil.

The differential 16 of the vehicle 10 includes a housing 18 and a tank 26 containing a quantity of oil 20 that is selectively supplied to the differential 16 to reduce the temperature of oil in the differential. The housing 18 contains the oil 20 that is splashed by a gear 22 disposed within the housing 18. The tank 26 is attached to the housing 18 behind the axle shafts 14. A tank inlet passage 32 receives oil 20 from the housing 18 and directs the oil 20 to the tank 26 until the tank 26 is full. A tank outlet 34 provides oil 20 to the housing 18 from the tank 26. The tank outlet 34 includes a valve 36 that opens when the oil temperature in the housing 18 is above a predetermined level to allow the oil 20 in the tank 26 to be supplied to the housing 18 and recirculated to the tank inlet 32 up to a point that the tank 26 is lull of the oil 20.

The cooling system disclosed herein is utilized to cool the differential oil 20 contained in the housing 18 of a differential 16 for a vehicle 10. The differential includes a housing 18 containing a first portion 28 of differential oil 20. A tank 26 contains a second portion 30 of differential oil 20. An inlet passage 32 is provided through which differential oil 20 flow's from the housing 18 to the tank 26. An outlet passage 34 is provided through which differential oil 20 flows from the tank 26 to the housing 18. A valve 36 is disposed in the outlet passage 34 that has a closed position wherein differential oil 20 is prevented from flowing through the outlet passage 34. The valve 36 has an open position in which differential oil 20 is permitted to flow from the tank 26 to the housing 18 in response to the temperature of the differential oil 20 in the housing 18 exceeding a predetermined temperature.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A differential of a vehicle comprising:
    a differential configured to receive torque from a driveshaft and to provide torque to two axle shafts, the differential having a housing and containing an oil that is splashed by a gear within the housing;
    a tank attached to the housing behind the axle shafts;
    a tank inlet configured to receive the oil from the housing and to direct the oil to the tank until the tank is full;
    a tank outlet configured to provide the oil to the housing from the tank, the tank outlet including a valve configured to open when a temperature of the oil in the housing is above a predetermined level to allow the oil in the tank to be supplied to the housing and recirculated to the tank inlet up to a point that the tank is full of the oil; and an oil fill port provided in the tank through which the oil is supplied to initially fill the tank, wherein the oil is further supplied through the oil fill port to fill the housing to a predetermined level.

2. The differential of claim 1 wherein the valve is a wax valve.

3. The differential of claim 2 wherein the wax valve is configured to close when the oil temperature in the housing is below the predetermined level.

4. The differential of claim 1 further comprising:

a controller; and a temperature sensor configured to sense the oil temperature of the oil in the housing and to provide a signal to the controller when the oil temperature of the oil in the housing is above a predetermined level, wherein the controller is configured to open the valve when the signal is received by the controller.

5. The differential of claim 4 wherein the temperature sensor is configured to provide a second signal to the controller when the temperature of the oil in the housing is below the predetermined level, wherein the controller is configured to close the valve when the second signal is received by the controller.

6. The differential of claim 1 wherein the tank inlet returns oil to the housing when the tank is full.

7. The differential of claim 1 wherein the tank inlet opens into the housing above a middle of the housing.

8. The differential of claim 1 wherein the tank outlet is openable into the housing below a middle of the housing.

9. The differential of claim 1 wherein the tank inlet is connected to a conduit that extends horizontally from an upper portion of the housing to the tank inlet.

10. A cooling system for an oil for a differential of a vehicle comprising:

a housing enclosing the differential, wherein the housing contains a first portion of the oil; and a tank containing a second portion of the oil, wherein a volume of the second portion of differential oil is greater than a volume of the first portion of differential oil the tank including an oil inlet in fluid communication with the housing of the differential, an oil outlet selectively in fluid communication with the housing, and a valve disposed in the oil outlet configured to prevent the second portion of the oil from flowing from the tank into the housing through the oil outlet when an oil temperature of the first portion of the oil in the housing is below a predetermined level, wherein the valve is opened to permit the second portion of the oil to flow from the tank to the housing when the oil temperature of the first portion of the oil in the housing is above a predetermined level.

11. The cooling system of claim 10 wherein the valve is a wax valve.

12. The cooling system of claim 11 wherein the wax valve is configured to close when the oil temperature of the oil in the housing is below the predetermined level.

13. The cooling system of claim 10 further comprising:

a controller; and an oil temperature sensor configured to sense a the oil temperature of the oil in the housing and to provide a signal to the controller when the oil temperature of the oil in the housing is above a predetermined level, wherein the controller is configured to open the valve when the signal is received by the controller.

14. The cooling system of claim 13 wherein the oil temperature sensor is configured to provide a second signal to the controller when the oil temperature of the oil in the housing is below the predetermined level, wherein the controller is configured to close the valve when the second signal is received by the controller.

15. A cooling system comprising:

a differential for a vehicle including a housing containing a first portion of differential oil;

a tank containing a second portion of differential oil, wherein a volume of the second portion of differential oil is greater than a volume of the first portion;

an inlet passage through which differential oil flows from the housing to the tank;

an outlet passage through which differential oil flows from the tank to the housing; and a valve disposed in the outlet passage that has a closed position wherein differential oil is prevented from flowing through the outlet passage, and an open position wherein differential oil is permitted to flow from the tank to the housing in response to a temperature of the differential oil in the housing exceeding a predetermined temperature.

16. The cooling system of claim 15 further comprising:

a gear of the differential configured to splash the differential oil from the housing to the inlet passage to refill the tank from the differential oil contained in the housing.

17. The cooling system of claim 15 wherein the valve is a wax valve.

18. The cooling system of claim 15 further comprising:

a controller; and an oil temperature sensor configured to sense a temperature of the differential oil in the housing and to provide a signal to the controller when the temperature of the differential oil in the housing is above a predetermined level, wherein the controller is configured to open the valve when the signal is received by the controller.

* * * * *